United States Patent
Subramaniyam

(10) Patent No.: US 8,778,172 B2
(45) Date of Patent: Jul. 15, 2014

(54) METHOD OF SCAVENGING HYDROGEN SULFIDE FROM HYDROCARBON STREAM

(75) Inventor: Mahesh Subramaniyam, Mumbai (IN)

(73) Assignee: Dorf Ketal Chemicals (I) Private Limited, Mumbai (IN)

(*) Notice: Subject to any disclaimer, the term of this patent is extended or adjusted under 35 U.S.C. 154(b) by 379 days.

(21) Appl. No.: 13/318,593

(22) PCT Filed: May 3, 2010

(86) PCT No.: PCT/IN2010/000286
§ 371 (c)(1),
(2), (4) Date: Nov. 2, 2011

(87) PCT Pub. No.: WO2010/128523
PCT Pub. Date: Nov. 11, 2010

(65) Prior Publication Data
US 2012/0055848 A1    Mar. 8, 2012

(30) Foreign Application Priority Data
May 5, 2009   (IN) .................. 1185/MUM/2009

(51) Int. Cl.
*C10G 17/02*   (2006.01)

(52) U.S. Cl.
USPC ........................................ 208/219

(58) Field of Classification Search
CPC ........ C10G 17/00; C10G 19/00; C10G 21/00; C10G 29/00; C10G 2300/44; C10G 2300/88
USPC ........................................ 208/219
See application file for complete search history.

(56) References Cited

U.S. PATENT DOCUMENTS

| | | |
|---|---|---|
| 1,991,765 A | 2/1935 | Marks |
| 4,680,127 A | 7/1987 | Edmondson |
| 5,085,842 A | 2/1992 | Porz et al. |
| 5,223,127 A * | 6/1993 | Weers et al. .............. 208/236 |
| 5,223,175 A | 6/1993 | Mabire |
| 5,284,635 A | 2/1994 | Frederic |
| 6,666,975 B1 | 12/2003 | Chen et al. |
| 2009/0314720 A1 * | 12/2009 | Smith et al. ............... 210/702 |

FOREIGN PATENT DOCUMENTS

| | | |
|---|---|---|
| JP | H03119092 A | 5/1991 |
| WO | 2010128523 A2 | 11/2010 |
| WO | 2010128523 A3 | 11/2010 |
| WO | 2010128523 A4 | 11/2010 |

OTHER PUBLICATIONS

Foreign communication from a related counterpart application—International Search Report and Written Opinion, PCT/IN2010/000286 dated Nov. 3, 2010, 10 pages.

Foreign communication from a related counterpart application—International Preliminary Report on Patentability, PCT/IN2010/000286 dated Feb. 28, 2011, 6 pages.

Foreign communication from a related counterpart application—International Preliminary Report on Patentability, PCT/IN2010/000286 dated Aug. 1, 2011, 9 pages.

* cited by examiner

*Primary Examiner* — Randy Boyer
*Assistant Examiner* — Juan Valencia
(74) *Attorney, Agent, or Firm* — Conley Rose, P.C.; Rodney B. Carroll

(57) ABSTRACT

The invention is related to hydrogen sulfide scavenging additive, capable of scavenging hydrogen sulfide in hydrocarbons by forming water soluble scavenged products which are capable of getting separated from hydrocarbon even at acidic pH without causing fouling and decomposition problems, consisting of aldehyde or aldehyde and polyethylene glycol [PEG], and wherein said aldehyde is glyoxylic acid. The invention is also related to a method of scavenging hydrogen sulfide employing present scavenging additive.

12 Claims, No Drawings

METHOD OF SCAVENGING HYDROGEN SULFIDE FROM HYDROCARBON STREAM

CROSS-REFERENCE TO RELATED APPLICATIONS

This application is a filing under 35 U.S.C. 371 of International Application No. PCT/IN2010/000286 filed May 3, 2010 entitled "Method of Scavenging Hydrogen Sulfide from Hydrocarbon Stream," claiming priority of Indian Patent Application No. 1185/MUM/2009 filed May 5, 2009, which applications are incorporated by reference herein in their entirety.

FIELD OF THE INVENTION

The present invention generally relates to scavenging hydrogen sulphide from hydrocarbon streams to remove or reduce levels of hydrogen sulphide therein, and particularly relates to scavenging hydrogen sulphide from hydrocarbon streams including crude oil, fuel oil, sour gas, and asphalts and refined products contained in storage tanks, vessels, pipelines.

BACKGROUND OF THE INVENTION

The toxicity of hydrogen sulfide in hydrocarbon streams is well known in the industry and considerable expense and efforts are expended annually to reduce its content to a safe level. Many regulations require pipeline gas to contain no more than 4 ppm hydrogen sulfide.

In large production facilities, it is generally more economical to install a regenerative system for treating hydrogen sulphide streams. These systems typically employ a compound used in an absorption tower to contact the produced fluids and selectively absorb the hydrogen sulfide and possibly other toxic materials such as carbon dioxide and mercaptans. The absorption compound is then regenerated and reused in the system. Typical hydrogen sulfide absorption materials include alkanolamines, hindered amines, and the like. However, such approach is not economically feasible for development stage of a field or in small producing fields.

For development stage of a field or in small producing fields where regenerative systems are not economical, it is necessary to treat the sour hydrocarbon production with non-regenerative scavengers.

The U.S. Pat. No. 1,991,765 disclosed use of reaction of aldehyde and hydrosulfide [and mercaptans, etc.] in aqueous solution having pH between 2 to 12. Thereafter, use of aldehydes to remove or scavenge hydrogen sulfide was reported in many patents. Mainly aldehydes including formaldehyde or glyoxal or formaldehyde in combination with other aldehydes or glyoxal in combination with other aldehydes have been used as hydrogen sulfide scavengers/removing agents. In the formaldehyde type reaction, the reaction produces a chemical complex known as formthionals (e.g., trithiane).

Based on an article appearing in the Oil & Gas Journal, Jan. 30, 1989, non-regenerative scavengers for small plant hydrogen sulfide removal fall into four groups: aldehyde based, metallic oxide based, caustic based, and other processes. In the removal of hydrogen sulfide by non-regenerative compounds, the scavenger reacts with the hydrogen sulfide to form a nontoxic compound or a compound which can be removed from the hydrocarbon.

The U.S. Pat. No. 4,680,127 [US '127] reported use of glyoxal or glyoxal in combination with other aldehydes in small amounts, which resulted in scavenging of hydrogen sulfide by forming water soluble products, which were stable only in alkaline pH of about 9, and decomposed in acidic pH of about 4.5 to 5.5.

The solution to problem of US '127 was provided by U.S. Pat. No. 5,085,842 [US '842] which reported use of glyoxal, but in very high amounts at least of 15% by weight, preferably of 25 to 45% by weight to form water insoluble products. The main problem of this solution is that glyoxal has to be employed in very high amounts, which also makes the process highly uneconomical. Additional problem of this method is that it results in water insoluble products, which are prone to get deposited in the vessels and cause fouling meaning thereby additional anti-fouling additive will be required. Accordingly, as per inventor of present invention, this method is neither economical nor industrially feasible and convenient.

The U.S. Pat. No. 6,666,975 [US '975] also reported use of glyoxal, but with aim to provide a method to reduce emission of hydrogen sulfide odor wherein products formed are water soluble and non-volatile. The US '975 does not aim to overcome problem of fouling in treatment of hydrocarbons which may be caused due to water insoluble products formed by use of glyoxal in higher amounts as reported in US '842, but only aims to avoid handling problems of glyoxal without any disclosure or teaching that how one can achieve hydrogen sulfide scavenging without facing a) problem of fouling which may be caused by employing method of US '842 and b) problem of decomposition of products which may be water soluble products but decompose in acidic pH which may be caused by employing method of US '127. Even the US '975 does not discuss US '842 and US' 127.

Accordingly, there is still a need of an additive or combination of additive which is suitable for scavenging sulfur containing compounds including hydrogen sulfide and mercaptans, particularly hydrogen sulfide in the hydrocarbons by producing water soluble scavenged products which are easy to be separated from the stream without causing any fouling and decomposition problems.

Therefore, present invention aims at providing a solution to above-described existing industrial problem by providing the additives which have been found to be suitable for scavenging sulfur containing compounds including hydrogen sulfide and mercaptans, particularly hydrogen sulfide in the hydrocarbons by producing water soluble scavenged products which are easy to be separated from the hydrocarbons without causing any fouling and decomposition problems.

OBJECTS OF THE INVENTION

Accordingly, main object of present invention is to provide additives for scavenging sulfur containing compounds including hydrogen sulfide and mercaptans, particularly hydrogen sulfide in the hydrocarbons including crude oil, fuel oils, sour gas, and asphalts and refined products contained in storage tanks, vessels, and pipelines.

Another object of present invention is to provide additives for scavenging hydrogen sulfide in hydrocarbon streams wherein said additive reacts with hydrogen sulfide and produces water soluble scavenged products which easily get separated from the hydrocarbon without causing any fouling and decomposition problems.

Still another object of present invention is to provide additives for scavenging hydrogen sulfide in hydrocarbon streams wherein scavenged products easily get separated from the hydrocarbon even at acidic pH.

Yet another object of present invention is to provide additives for scavenging hydrogen sulfide in hydrocarbon streams wherein scavenged products easily get separated from the stream during the process in desalter.

This is also an object of the present invention to provide a method for scavenging sulfur containing compounds including hydrogen sulfide and mercaptans, particularly hydrogen sulfide in the hydrocarbons, wherein scavenging additive reacts with hydrogen sulfide and produces water soluble scavenged products which easily get separated from the stream even at acidic pH that's too without causing any fouling and decomposition problems.

Other objects and advantages of present invention will become more apparent from the following description when read in conjunction with examples, which are not intended to limit scope of present invention.

SUMMARY OF THE INVENTION

With aim to overcome above-described problems of prior art and to achieve above-described objects of the invention, the inventor has found that when an hydrocarbon containing sulfur compounds including hydrogen sulfide, mercaptans is treated with glyoxylic acid, the hydrogen sulfide is scavenged and the scavenged products thus formed are water soluble which easily get separated from the hydrocarbon even at acidic pH and that's too without causing any fouling and decomposition problems.

The inventor has further found that when an hydrocarbon containing sulfur compounds including hydrogen sulfide, mercaptans is treated with composition consisting of glyoxylic acid and polyethylene glycol [PEG], the capability of glyoxylic acid to scavenge hydrogen sulfide surprisingly gets enhanced to a greater extent and the scavenged products thus formed remain water soluble even at acidic pH and get easily separated from the hydrocarbon even at acidic pH and that's too without causing any fouling and decomposition problems.

Accordingly, the present invention relates to hydrogen sulfide scavenging additive which scavenges hydrogen sulfide in hydrocarbons by forming water soluble scavenged products which get easily separated from the hydrocarbon even at acidic pH and that's too without causing any fouling and decomposition problems, wherein the scavenging additive consists of aldehyde and polyethylene glycol [PEG], and wherein aldehyde is glyoxylic acid.

In one embodiment, the present invention relates to hydrogen sulfide scavenging additive which scavenges hydrogen sulfide in hydrocarbons by forming water soluble scavenged products which get easily separated from the hydrocarbon even at acidic pH and that's too without causing any fouling and decomposition problems, wherein the scavenging additive consists of glyoxylic acid.

In one embodiment, the present invention also relates to method of scavenging hydrogen sulfide in hydrocarbons, wherein hydrocarbon is treated with scavenging additive consisting of glyoxylic acid and polyethylene glycol [PEG] and said treatment forms water soluble scavenged products which get easily separated from the hydrocarbon even at acidic pH and that's too without causing any fouling and decomposition problems.

In another embodiment, the present invention also relates to method of scavenging hydrogen sulfide in hydrocarbons, wherein hydrocarbon is treated with scavenging additive consisting of glyoxylic acid, and said treatment forms water soluble scavenged products which get easily separated from the hydrocarbon even at acidic pH and that's too without causing any fouling and decomposition problems.

DETAILED DESCRIPTION

In accordance with present invention, the hydrogen sulfide scavenging composition is a synergistic combination of aldehyde and polyethylene glycol [PEG], wherein aldehyde is glyoxylic acid.

In accordance with one of the embodiments of present invention, the glyoxylic acid is one which is available commercially including glyoxylic acid with 50% dilution. It may be identified as CAS No 298-12-4.

In accordance with one of the embodiments of present invention, the polyethylene glycols (PEG) may be selected from PEG having molecular weight varying from about 200 to about 1000 dalton, preferably from about 200 to 600 dalton. However, the inventor has found that molecular weight of PEG does alter its capability of scavenging hydrogen sulfide [Table-I], but when it is taken as a composition with glyoxylic acid its molecular weight does not alter its capability of scavenging hydrogen sulfide [Table-III].

In accordance with present invention, the ratio of the components of hydrogen sulfide scavenging composition of present invention varies between 99 parts of aldehyde to 1 part of PEG and 1 part of aldehyde to 99 parts of PEG. The inventor has found that amount of PEG varying up to 20% in scavenging composition of present invention is sufficient to substantially enhance scavenging capability of glyoxylic acid.

In accordance with present invention, in carrying out the method of scavenging hydrogen sulfide in hydrocarbon, the scavenging additive is added to the hydrocarbon or gas stream in a concentration sufficient to substantially scavenge $H_2S$ or $H_2S$ and mercaptans therein. In accordance with one of the preferred embodiments of present invention, the scavenging additive is added in an amount so as to achieve ratio of hydrogen sulfide to scavenging additive varying from about 1:0.1 to about 1:2, preferably from about 1:0.2 to about 1:1.

In treating hydrocarbon streams, the scavenging additive of present invention may be added neat or after dissolving in a solvent, selected from a mutual solvent or water, and may be injected by conventional means including by a chemical injection pump or any other mechanical means for dispersing scavenging additive in the hydrocarbon or hydrocarbon stream.

In accordance with one of the preferred embodiments of present invention, the scavenging additive of present invention may be injected in the flow lines in case of development stage of a field or in small producing fields, or the gas containing hydrogen sulfide may be passed through an absorption tower wherein scavenging additive of present invention has been injected in case of large production facilities.

The scavenging additive and method of present invention may be used in scavenging hydrogen sulphide from hydrocarbon streams including crude oil, fuel oil, sour gas, and asphalts and refined products contained in storage tanks, vessels, pipelines.

EXAMPLES

The present invention is now described with the help of following examples, which are not intended to limit scope of present invention, but have been incorporated to illustrate advantages of present invention and best mode to perform it. The following examples also demonstrate surprising effectiveness of scavenging additives of present invention, which is composition consisting of glyoxylic acid and PEG, or glyoxylic acid.

Example 1

Glyoxal as $H_2S$ Scavenger

A solution of glyoxal in (DM) water was prepared so as to get 5% glyoxal content in the final solution. The $H_2S$ gas was bubbled continuously through this solution at about 30° C. for about 3 h. It was observed that the solution started turning turbid after about 30 min of $H_2S$ sparging. After 3 h, water was evaporated in an oven at 120° C. The elemental analysis of the oven dried sample showed about 30.52% C, about 3.65% H and about 29.54% S. The oven dried residue was found to be insoluble in water and methanol. This example confirms that glyoxal acts as $H_2S$ scavenger, but results in water insoluble products, which for the reasons described herein above are not desired.

Example 2

Glyoxylic acid as H2S scavenger

Example 1 was repeated but with glyoxylic acid so as to have 5% glyoxylic acid content. It was observed that the solution remained clear even till the end of the experiment means for 3 h. The elemental analysis of the oven dried sample showed about 23.58% C, about 3.81% H and about 27.05% S, and the oven dried residue was found to be soluble in water and methanol. This example confirms that glyoxylic acid is capable of scavenging the $H_2S$, but surprisingly at same concentration as of glyoxal it results in water soluble products, which for the reasons described herein above are desired. Therefore, it can be concluded that the behavior or mechanism of glyoxylic acid is not same as of glyoxal.

Example 3

PEG as an H2S scavenger

Example 1 was repeated but with PEG so as to have 5% PEG content. It was observed that concentration of $H_2S$ was reduced but very minimal confirming that PEG is not a good $H_2S$ scavenger.

To further confirm above finding that PEG is not a good $H_2S$ scavenger, efficiency of 1000 ppm of PEG-200, PEG-400 and PEG-600 was measured for 1000 ppm of $H_2S$ concentration and was compared with a blank solution prepared with same concentration of $H_2S$ but without PEG and was found that efficiency increased with increase in molecular weight of PEG, but the efficiency was very low, and hence, PEG could not be accepted as economical and industrially applicable $H_2S$ scavenger [Table-I].

TABLE I

| Experiment No. | Additive | Dosage (ppm) | % Efficiency |
| --- | --- | --- | --- |
| Expt. 1 | PEG-200 | 1000 | 5.26 |
| Expt. 2 | PEG-400 | 1000 | 10.52 |
| Expt. 3 | PEG-600 | 1000 | 15.79 |

Example 4

Glyoxylic Acid and Combination of Glyoxylic Acid and PEG as $H_2S$ Scavengers in Accordance with Present Invention The hydrogen sulfide [$H_2S$] scavenging was conducted by partially saturating kerosene oil with $H_2S$ gas at room temperature. The concentration of $H_2S$ is mentioned for each table or respective example and was maintained for each experiment in a table. The defined scavenger sample was added into the sample bottles. The bottles, each containing a scavenger sample, were shaken and the concentration of $H_2S$ in the vapor phase of each bottle was measured with elapsed time (at room temperature) of about 20 h using dragger tubes. The blank test was conducted without adding any scavenging additive. The glyoxylic acid used in each experiment is 50% diluted as available commercially. The scavenged products formed were found to be water soluble and were easily separated in aqueous layer even at acidic and neutral pH.

TABLE II

[Concentration of Hydrogen sulfide is 1000 ppm]

| Expt. No. | Product | Dosage ppm | % Efficiency |
| --- | --- | --- | --- |
| Expt. 4 | Blank | — | 0 |
| Expt. 5 | Glyoxylic Acid | 1000 | 82 |
| Expt. 6 | Glyoxylic Acid | 500 | 60 |
| Expt. 7 | Glyoxylic Acid/PEG 200 (95/5) | 500 | 92 |
| Expt. 8 | Glyoxylic Acid/PEG 200 (90/10) | 500 | 90 |

From above examples it is observed that when glyoxylic acid is taken without PEG, it acts as hydrogen sulfide scavenger and has efficiency of about 82% at 1000 ppm dosage, but at 500 ppm dosage its efficiency is as low as 60% for 1000 ppm of Hydrogen sulfide. However, when 5% of PEG-200 is added to glyoxylic acid then surprisingly substantially enhanced efficiency of 92% is observed even at 500 ppm dosage. These experiments confirm that glyoxylic acid is hydrogen sulfide scavenger, but combination of glyoxylic acid and PEG is synergistic in nature and surprisingly achieves substantially enhanced efficiency even at half of the dosage of glyoxylic acid.

TABLE III

[Concentration of Hydrogen sulfide is 600 ppm]

| Expt. No. | Scavenging Additive | Dosage ppm | % Efficiency |
| --- | --- | --- | --- |
| Expt. 9 | Blank | — | 0 |
| Expt. 10 | Glyoxylic Acid | 500 | 42 |
| Expt. 11 | Glyoxylic Acid/PEG 200 (95/5) | 500 | 95 |
| Expt. 12 | Glyoxylic Acid/PEG 400 (95/5) | 500 | 93 |

From above examples, it is observed that when glyoxylic acid is taken without PEG, its efficiency at 500 ppm dosage is as low as 42% for 600 ppm of Hydrogen sulfide. However, when 5% of PEG-200 or of PEG-400 is added to glyoxylic acid, then surprisingly substantially enhanced efficiency of 95% is observed at same dosage. These experiments also confirm that combination of glyoxylic acid and PEG is synergistic in nature and surprisingly achieves substantially enhanced efficiency even if taken at same dosage.

TABLE IV

| Expt. No. | Scavenging Additive | % Efficiency |
|---|---|---|
| Expt. 10 | Hydrogen sulfide is 450 ppm, Glyoxylic Acid 237.5 ppm and PEG-200 12.5 ppm | 72.5 |
| Expt. 11 | Hydrogen sulfide is 200 ppm, Glyoxylic Acid 71.25 ppm and PEG-200 3.75 ppm | 74 |

From above examples, it is again observed that when scavenging additive of present invention consisting of glyoxylic acid and PEG is taken, the efficiency at 450 ppm dosage of $H_2S$ is as high as 72.5% just for 250 ppm of scavenging additive of present invention, and at 200 ppm dosage of $H_2S$ it is as high as 74% just for 75 ppm of scavenging additive of present invention meaning thereby even one half or one fourth of present additive is sufficient to scavenge hydrogen sulfide in hydrocarbons.

The above experiments confirm that glyoxylic acid is capable of scavenging $H_2S$ by producing water soluble products, however, when it is taken along with very small amount of about 5% to 10% of PEG, its efficiency to scavenge $H_2S$ surprisingly increases substantially confirming synergistic effect of scavenging additive of present invention.

From the foregoing examples, it is also clear that with hydrogen sulfide scavenging additive of present invention and method of scavenging hydrogen sulfide in hydrocarbons by employing additives of present invention, one can now achieve hydrogen sulfide scavenging without facing a) problem of fouling, and hence without requiring additional antifouling additive, and b) problem of decomposition of products in acidic pH, and hence hydrogen sulfide is substantially scavenged in one attempt only.

Further, no elimination of hydrogen sulfide odor was observed in any of the above-described experiments which confirm that hydrogen sulfide has been scavenged to maximum possible level and the concentration of hydrogen sulfide, if any in the hydrocarbon is negligible.

The invention claimed is:

1. Hydrogen sulfide scavenging additive capable of scavenging hydrogen sulfide in hydrocarbons by forming water soluble scavenged products which are capable of getting separated from hydrocarbon even at acidic pH without causing fouling and decomposition problems, wherein the scavenging additive consists of aldehyde and polyethylene glycol [PEG], and wherein said aldehyde is glyoxylic acid.

2. Hydrogen sulfide scavenging additive as claimed in claim 1, wherein said polyethylene glycols (PEG) is selected from PEG having molecular weight varying from 200 to 1000 dalton.

3. Hydrogen sulfide scavenging additive as claimed in claim 1, wherein said polyethylene glycols (PEG) is selected from PEG having molecular weight varying from 200 to 600 dalton.

4. Hydrogen sulfide scavenging additive as claimed in claim 1, wherein said scavenging additive consists of 99 parts of aldehyde to 1 part of PEG and 1 part of aldehyde to 99 parts of PEG.

5. Hydrogen sulfide scavenging additive as claimed in claim 1, wherein amount of PEG in said scavenging additive varies up to 20%.

6. A method of scavenging hydrogen sulfide in hydrocarbons, wherein hydrocarbon is treated with scavenging additive consisting of glyoxylic acid and polyethylene glycol [PEG] and said treatment forms water soluble scavenged products which get separated from hydrocarbon stream even at acidic pH without causing fouling and decomposition problems.

7. A method of scavenging hydrogen sulfide as claimed in claim 6, wherein said scavenging additive is taken in an amount so as to achieve ratio of hydrogen sulfide in hydrocarbon to scavenging additive varying from 1:0.1 to 1:2.

8. A method of scavenging hydrogen sulfide as claimed in claim 6, wherein said scavenging additive is taken in an amount so as to achieve ratio of hydrogen sulfide in hydrocarbon to scavenging additive varying from 1:0.2 to 1:1.

9. A method of scavenging hydrogen sulfide as claimed in claim 6, wherein said hydrocarbon includes crude oil, fuel oil, sour gas, and asphalts and refined products contained in storage tanks, vessels, and pipelines.

10. Hydrogen sulfide scavenging additive as claimed in claim 1, wherein it is capable of scavenging sulfur compounds including hydrogen sulfide and mercaptans.

11. A method as claimed in claim 6, wherein scavenging additive is capable of scavenging sulfur compounds including hydrogen sulfide and mercaptans.

12. Hydrogen sulfide scavenging additive as claimed in claim 4, wherein amount of PEG in said scavenging additive varies up to 20%.

\* \* \* \* \*